(12) United States Patent
Millyard et al.

(10) Patent No.: US 11,770,053 B2
(45) Date of Patent: Sep. 26, 2023

(54) METHOD OF DETERMINING A VOICE COIL POSITION AND VOICE COIL SYSTEM

(71) Applicant: Tymphany Acoustic Technology Limited, Taipei (TW)

(72) Inventors: Ruben Minoru Tuemp Millyard, Taipei (TW); George Albert Bullimore, Taipei (TW)

(73) Assignee: TYMPHANY ACOUSTIC TECHNOLOGY LIMITED, Taipei (TW)

(*) Notice: Subject to any disclaimer, the term of this patent is extended or adjusted under 35 U.S.C. 154(b) by 352 days.

(21) Appl. No.: 17/113,828

(22) Filed: Dec. 7, 2020

(65) Prior Publication Data
US 2021/0175782 A1 Jun. 10, 2021

Related U.S. Application Data
(60) Provisional application No. 62/944,731, filed on Dec. 6, 2019.

(51) Int. Cl.
| | |
|---|---|
| *G01B 7/14* | (2006.01) |
| *G01B 7/30* | (2006.01) |
| *H01F 5/00* | (2006.01) |
| *H02K 11/225* | (2016.01) |
| *H04R 9/06* | (2006.01) |
| *H02K 11/33* | (2016.01) |
| *H02K 41/035* | (2006.01) |
| *G01P 3/488* | (2006.01) |

(Continued)

(52) U.S. Cl.
CPC ............ *H02K 11/225* (2016.01); *G01P 1/026* (2013.01); *G01P 3/488* (2013.01); *H02K 11/33* (2016.01); *H02K 41/0354* (2013.01); *H04R 9/06* (2013.01); *G01D 5/145* (2013.01); *G01D 5/20* (2013.01); *G01D 5/2013* (2013.01)

(58) Field of Classification Search
CPC .. H02K 11/225; H02K 11/33; H02K 41/0354; H02K 41/0356; H04R 9/06; H04R 29/003; H04R 9/04; H04R 29/001; H04R 3/002; G01P 3/488; G01P 1/026; G01P 3/487; G01D 5/2013; G01D 5/145; G01D 5/20
USPC ...... 324/51, 55, 200, 207.11, 207.13, 207.15
See application file for complete search history.

(56) References Cited

U.S. PATENT DOCUMENTS

| | | | |
|---|---|---|---|
| 2013/0202122 A1* | 8/2013 | Citerin | H04R 29/001 381/59 |
| 2016/0209620 A1* | 7/2016 | Code | H02K 41/0356 |

(Continued)

*Primary Examiner* — Raul J Rios Russo
(74) *Attorney, Agent, or Firm* — MUNCY, GEISSLER, OLDS & LOWE, P.C.

(57) ABSTRACT

A method for determining a voice coil position of a voice coil includes providing a magnetic circuit having a magnetic gap and suspending the voice coil in the magnetic gap, applying a driving signal to the voice coil to produce an electromotive force, providing inductive sensors mechanically coupled to the voice coil, measuring inductive sensor signals based on outputs from the inductive sensors, processing the measured inductive sensor signals by determining at least one inductive sensor signal ratio, and determining a representation of the voice coil position based on the at least one inductive sensor signal ratio. A voice coil system, which can be incorporated in a loudspeaker, is configured to carry out the method.

40 Claims, 3 Drawing Sheets

Figure 1:
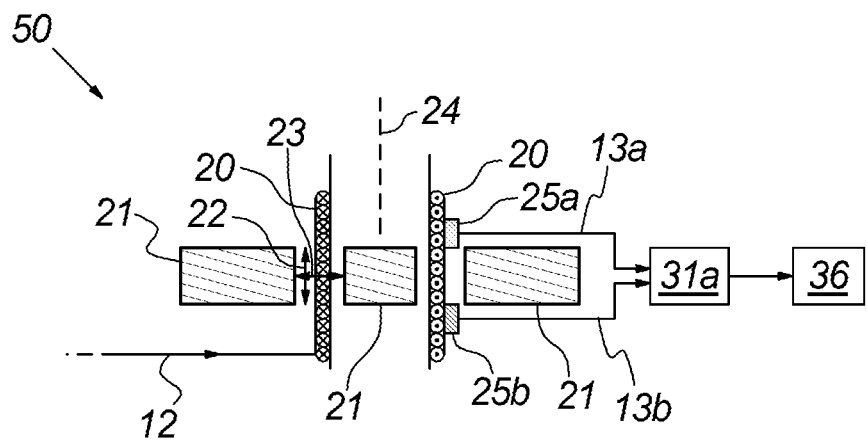

(51) Int. Cl.
*G01P 1/02* (2006.01)
*G01D 5/20* (2006.01)
*G01D 5/14* (2006.01)

(56) References Cited

U.S. PATENT DOCUMENTS

| | | | |
|---|---|---|---|
| 2016/0212546 A1* | 7/2016 | Salvatti | H04R 9/06 |
| 2016/0323674 A1* | 11/2016 | Porter | H04R 31/006 |
| 2018/0175758 A1* | 6/2018 | Chan | H02K 11/225 |
| 2022/0103045 A1* | 3/2022 | Kawamoto | H02K 11/225 |

* cited by examiner

METHOD OF DETERMINING A VOICE COIL POSITION AND VOICE COIL SYSTEM

CROSS REFERENCE TO RELATED APPLICATIONS

The present application claims priority to U.S. Provisional Application No. 62/944,731, which was filed on Dec. 6, 2019, the entire contents of which are hereby incorporated by reference.

FIELD OF THE INVENTIONS

The present invention relates to a method for determining the position of a voice coil in a loudspeaker, a voice coil system arranged to carry out the method and a loudspeaker comprising such a voice coil system.

BACKGROUND OF THE INVENTION

A loudspeaker typically comprises a voice coil which is arranged to reciprocate and thereby actuate a loudspeaker diaphragm in order to acoustically reproduce an applied audio signal. Determining the instantaneous position of the voice coil during its reciprocating motion is advantageous for many different purposes, but known solutions are challenging to implement.

One approach for determining the voice coil position is to use an inductive coil, but such a coil may typically provide a velocity-dependent signal, which is not immediately suitable for isolating the position of the voice coil.

It is therefore an object of the present invention to provide an improved way of determining the position of a voice coil in a loudspeaker.

SUMMARY OF THE INVENTION

The inventors have identified the above-mentioned problems and challenges related to determining the position of a voice coil in a loudspeaker, and subsequently made the below-described invention, which may be utilized to provide an improved determination of a voice coil position.

An aspect of the invention relates to a method for determining a voice coil position of a voice coil, comprising the steps of:
  providing a magnetic circuit having a magnetic gap and suspending said voice coil in said magnetic gap;
  applying a driving signal to said voice coil to produce an electromotive force moving said voice coil along a travelling axis;
  providing inductive sensors, said inductive sensors being mechanically coupled to said voice coil, said inductive sensors comprise at least a first inductive sensor and a second inductive sensor;
  measuring inductive sensor signals, said inductive sensor signals comprise a first inductive sensor signal based on an output from said first inductive sensor, and said inductive sensor signals comprise a second inductive sensor signal based on an output from said second inductive sensor;
  processing said measured inductive sensor signals, said processing comprises determining at least one inductive sensor signal ratio based on said inductive sensor signals, said at least one inductive sensor signal ratio comprises a first inductive sensor signal ratio based on said first inductive sensor signal and said second inductive sensor signal; and
  determining a representation of said voice coil position based on said at least one inductive sensor signal ratio.

A voice coil is understood to be a coil of wire, which, under the influence of an applied current and a magnetic field, is arranged to generate an electromotive force to move a diaphragm of a loudspeaker in order to produce acoustic sounds. The magnetic field may be established by a magnet, such as a permanent magnet or an electromagnet, present in a magnetic circuit. The magnetic circuit may comprise a magnetic gap, in which the voice coil reciprocates to produce acoustic sound by reciprocating a diaphragm of the loudspeaker. The magnetic gap may also be referred to as an air gap. The reciprocation of the voice coil occurs in response to application of a driving signal. The reciprocating excursion, i.e., reciprocating displacement, of the voice coil of the loudspeaker results in acoustic reproduction of the applied driving signal because the reciprocation of the voice coil is used to reciprocate a diaphragm of the loudspeaker, which thereby pushes on the air, thus generating acoustic sound waves.

When applying a driving signal to a voice coil, a current is sent to the coil windings of the voice coil resulting in an electromotive force on the coil windings, due to the Lorentz force, which drives the voice coil along a travelling axis which may be substantially perpendicular to the coil windings. By a travelling axis is understood an axis along which the voice coil may reciprocate. Applying a driving signal to a loudspeaker may be understood as applying a driving signal to a voice coil of the loudspeaker.

A voice coil of a loudspeaker works on the principle of the Lorentz force, which is the force generated when a current-carrying conductor is placed in a magnetic field. In the case of a voice coil for a loudspeaker, the magnetic field is present in the magnetic gap, or air gap, of the magnetic circuit. When current is applied to the voice coil, an electromotive force is generated, and the magnitude of the force may be approximately proportional to the applied current for small excursions of the voice coil. Thus, by increasing the current in a driving signal, e.g., by increasing the amplitude of the driving signal, the resulting electromotive force increases which further results in an increased excursion of the voice coil, i.e., displacement, of the voice coil, within the limitations of the loudspeaker. The electromotive force may be counterbalanced by a restoring force which may be provided by a loudspeaker suspension, i.e., a loudspeaker spider or loudspeaker damper.

According to various embodiments of the invention, inductive sensors are mechanically coupled to the voice coil. Mechanically coupled may also be understood that the inductive sensors are rigidly coupled to the voice coil such that the inductive sensors reciprocate synchronously with reciprocations of the voice coil. In other words, the excursion of the induction sensors may be similar to the excursion of the voice coil. Typical embodiments may have two or three inductive sensors, but the invention is not limited to these examples. An inductive sensor may be an inductive sensor coil which may be a coil of wire or even a single loop of wire. The inductive sensors may be mechanically coupled, i.e., rigidly coupled, to the voice coil at various positions on the voice coil, such as at or in close proximity to endings of the voice coil or a center position of the voice coil along the travelling axis.

The magnetic field in the vicinity of the magnetic gap of a magnetic circuit is typically strongest within the magnetic gap and decreases along directions away from the magnetic gap. Thus, when a driving signal is applied to the voice coil such that it reciprocates, the inductive sensors may experience a varying magnetic field from the magnetic gap as they traverse the magnetic gap.

An inductive sensor may provide an inductive sensor signal when subject to a changing magnetic field. The inductive sensor signal may be proportional to the rate at which the magnetic field changes at the inductive sensor. The inductive sensor may be associated with an inductive sensor direction, in which it is most sensitive to changes in magnetic field. The inductive sensors may be inductive sensor coils, Hall-effect sensors, magnetometers or any other type of sensor arranged to measure a magnetic field such as measure a change in magnetic field.

According to embodiments of the invention, inductive sensor signals from inductive sensors may be used to determine at least one inductive sensor signal ratio, which may be advantageous for the determination of a representation of a voice coil position. The sensor signal from a single inductive sensor may depend on dynamically changing variables, such as the velocity of the voice coil, however depending on how an inductive sensor signal ratio is established such dynamically changing variables may effectively be cancelled out. Thus, by determining a voice coil position on the basis of an inductive sensor signal ratio, the determination may advantageously be performed without having to take into account the velocity of the voice coil. This is also explained in further details in the following.

In the following, embodiments of the invention using configurations of two inductive sensors are presented, where the inductive sensors are tightly wound inductive sensor coil. However, it should be appreciated that the present invention relates to the use of any type of inductive sensors and inductive sensor configuration arranged to provide inductive sensor signals suitable for the establishing inductive sensor signal ratios for determining a position of the voice coil.

Furthermore, it should be noted that an inductive sensor signal is not necessarily to be interpreted in a narrow sense, i.e., as a mere ratio between two numbers, as the ratio may also include contributions from other sources than two inductive sensors, or an inductive sensor signal ratio is not precisely a ratio of two values but may be an approximation of a ratio of two inductive sensor signal values.

According to certain exemplary embodiments of the invention, each individual inductive sensor is arranged such that its inductive sensor direction is sensitive to the magnetic field in the magnetic gap when the voice coil traverses the magnetic gap. The individual inductive sensors may furthermore be arranged to be insensitive to a driving signal applied to the voice coil to which the inductive sensors are mechanically coupled. As such, the inductive sensor directions of the inductive sensors may be orthogonal, i.e., perpendicular, to the travelling axis of the voice coil, and the induction sensors may be positioned on the outer surface of the voice coil. By an orthogonal alignment of the inductive sensors with respect to the travelling axis of the voice coil is achieved that the inductive sensors are minimally affected by the driving signal of the voice coil.

An inductive sensor may be a tightly wound coil and an inductive sensor signal may be a voltage. The electromotive force $\varepsilon$ of a tightly wound coil of N windings subject to a changing magnetic field may be described by Faraday's law of induction $$\varepsilon = -N \frac{d\Phi}{dt}, \quad \text{(Eq. 1)}$$

where $\Phi$ is the magnetic flux of the magnetic field and t is time. In this context, the magnetic flux may be thought of as the surface integral of the normal component of the magnetic field flux density passing through a surface whose boundary is a winding of the coil. In this context, a sensitivity direction of an inductive coil may be understood as a direction in which it is most sensitive to a change of the magnetic flux.

Eq. 1 may be rewritten using the chain rule of calculus to obtain $$\varepsilon = -N \frac{d\Phi}{dt} = -N \frac{d\Phi}{dh} \frac{dh}{dt} = -N \frac{d\Phi}{dh} v_h, \quad \text{(Eq. 2)}$$

where h is a spatial coordinate along the direction of the travelling axis and $v_h$ is the velocity of the inductive sensor along this axis.

Since the inductive sensors are mechanically coupled to the voice coil and thus reciprocate synchronously to the reciprocation of the voice coil, their velocities along the travelling axis at any given time are all the same $v_h$. Therefore, the ratio of two electromotive forces of two inductive sensor coils, e.g. the first inductive sensor and the second inductive sensor, if both comprises a similar number N of windings, may be written as $$\frac{\varepsilon_A}{\varepsilon_B} = \frac{\frac{d\Phi_A}{dh_A}}{\frac{d\Phi_B}{dh_B}}, \quad \text{(Eq. 3)}$$

where the subscript A refers to variables relating to one of the inductive sensor coils and the subscript B refers to variables relating to another inductive sensor coil.

The expression on the right-hand side of Eq. 3 is independent on the voice coil velocity, i.e., the ratio of the two electromotive forces depends only on a ratio of change of magnetic flux along the travelling axis for the two inductive sensors. The two inductive sensor coils are preferably displaced along the travelling axis. When the voice coil is translated along the travelling axis, the right-hand side of Eq. 3 may provide a value which is directly related to the properties of the magnetic field in the vicinity of the two inductive sensors. This value may be unique for all different positions $h_{vc}$ of the voice coil since, in practice, the magnetic flux density is different at various positions along the travelling axis. A measurement of the ratio of the two electromotive forces, i.e., a voltage ratio, may thus, according to Eq. 3, be directly related to a voice coil position and may, thus, be understood as a representation of a voice coil position.

The ratio of Eq. 3 may be measured in an independent calibration procedure and linked to a voice coil position to provide a ratio-to-position transfer function. That is, for a non-zero velocity of the voice coil, Eq. 3 may be written as $$\frac{\varepsilon_A}{\varepsilon_B} = f_1^{-1}(h_{vc}), \quad \text{(Eq. 4)}$$

or $$h_{vc} = f_1\left(\frac{\varepsilon_A}{\varepsilon_B}\right), \quad \text{(Eq. 5)}$$

where $f_1$ is a ratio-to-position transfer function and $f_1^{-1}$ is a position-to-ratio transfer function which may be an inverse of $f_1$, and $f_1$ and/or $f_1^{-1}$ may be measured in an independent calibration procedure.

In other embodiments of the invention, the inductive sensors may be arranged such that the inductive sensor signals are more affected by the driving signal than with the orthogonal alignment of the inductive sensors with respect to the traveling axis of the voice coil. This may for example be the case when the inductive sensors, in the form of inductive sensor coils are wound within or around the voice coil, around the travelling axis. In this case, an inductive sensor signal may be sensitive to the driving signal as well as the magnetic field in the magnetic gap, when the inductive sensor coil traverses the magnetic gap.

Embodiments of the invention where inductive sensor coils are wound around the voice coil may be understood in terms of a Lorentz force F on a charge q moving with a velocity $v_q$ in a magnetic field B $$F = qv_q B, \qquad (\text{Eq. 6})$$

where a term of the Lorentz force related to electric fields has been omitted and an assumption has been made that the Lorentz force, the velocity and the magnetic field are perpendicular to one another. The direction of F may be determined using the so-called right-hand rule for cross-products.

A Lorentz force on an electron in a wire loop of an inductive coil, i.e. an inductive sensor coil, is related to an electromotive force produced in the wire due to its movement. Generally, the electromotive force may be defined as the work W done per charge and work may generally be calculated as a product of force and displacement. As such, the electromotive force due to a Lorentz force on electrons in a wire loop of circumference $L_c$ may be defined through the work done on a charge if it travels once around the loop $$\varepsilon = \frac{W}{q} = \frac{FL_c}{q} = v_q B L_c, \qquad (\text{Eq. 7})$$

where the definition of Lorentz force of Eq. 6 is inserted, and the magnitude of B is assumed to be constant around the wire loop. So, if a tightly wound coil of N wire loops, wound around the voice coil, traverses the magnetic gap region, the electromotive force across the coil due to movement in the magnetic field is $$\varepsilon = Nv_h BL_c, \qquad (\text{Eq. 8})$$

where $v_q$ of Eqs. 6-7 has been replaced by $v_h$, i.e. the velocity of the voice coil and the inductive coil, since charges move with the voice coil as the voice coil traverse the magnetic gap region. Note that $L_c$ is the length of one wire loop.

Eq. 8 describes electromotive force due to a magnetic field of the magnetic gap. However, the driving signal applied to the voice coil may induce a magnetic field of the voice coil, which may provide an additional contribution to the electromotive force in an inductive coil wound around the voice coil. The contribution to the electromotive force in an inductive coil from a driving signal applied to a voice coil may be due to an induced magnetic field of the voice coil, and the contribution may be described be Faraday's law of induction Eq. 1. For an inductive coil wound around a voice coil, the relevant magnetic flux is the magnetic flux within the voice coil induced by the voice coil. This induced magnetic flux may be proportional to the current of the driving signal applied to the voice coil. Furthermore, this current may be proportional to the excursion, i.e., displacement, of the voice coil relative to the resting position of the voice coil which may be the position of the voice coil when no driving signal is applied. The magnetic flux may be proportional to the position, and consequently, Eq. 1 may be rewritten as $$\varepsilon = -NC\frac{dh}{dt} = -NCv_h, \qquad (\text{Eq. 9})$$

where C is a proportionality constant which may depend on voice coil geometry and the restoring force on the voice coil.

The ratio of electromotive forces from two similar inductive coils wound around the voice coil may then be written as $$\frac{\varepsilon_A}{\varepsilon_B} = \frac{Nv_h B_A L_c + NCv_h}{Nv_h B_B L_c + NCv_h} = \frac{B_A L_c + C}{B_B L_c + C}, \qquad (\text{Eq. 10})$$

where the subscript A refers to variables relating to one of the inductive sensor coils and the subscript B refers to variables relating to another inductive sensor coil.

Eq. 10 has the same useful properties as Eq. 3: the right-hand side of Eq. 10 is independent of the voice coil velocity and the ratio of the two electromotive forces therefore only depends on a ratio of two functions of local magnetic fields. Again, this value may be unique for all different positions of the voice coil, within the limitations of the loudspeaker. A measurement of the ratio of the two electromotive forces, i.e., a voltage ratio may, thus, according to Eq. 10, for a non-zero velocity, be understood as a representation of a voice coil position $h_{vc}$. Additionally, the voltage ratio may be directly related to a voice coil position $h_{vc}$ by a transfer function $$\frac{\varepsilon_A}{\varepsilon_B} = f_2^{-1}(h_{vc}), \qquad (\text{Eq. 11})$$

or $$h_{vc} = f_2\left(\frac{\varepsilon_A}{\varepsilon_B}\right), \qquad (\text{Eq. 12})$$

where $f_2$ is a ratio-to-position transfer function and $f_2^{-1}$ is a position-to-ratio transfer function which may be an inverse of $f_2$, and $f_2$ and/or $f_2^{-1}$ may be measured in an independent calibration procedure.

In summary, when a voice coil is driven by application of a driving signal, a real-time measurement of inductive sensor signals, in particular electromotive forces or voltages, may be used to determine an inductive sensor signal ratio $\Sigma_A/\Sigma_B$ which in combination with a ratio-to-position transfer function may provide a real-time position determination of the driven voice coil. The inductive sensors may for example both be orthogonal to the direction of translation and sensitive to the magnetic field in the magnetic gap as described by Eqs. 4-5. Alternatively, the inductive sensors may be wound around the voice coil as described by Eqs. 11-12. In both these types of embodiments, a signal ratio may be converted to a position by a ratio-to-position transfer function. However, any pair of inductive sensors, which may provide inductive sensor signals, in which a ratio-to-position transfer function may be applied to a ratio of the inductive sensor signals may also be used according to the present invention.

The above derived equations are derived using some approximations, but embodiments of the invention are not restricted to embodiments where these approximations are valid. For example, the magnetic field in the magnetic gap is not restricted to be locally perpendicular to the translation direction of a wire segment of an inductive coil as assumed in the derivation of Eq. 7. The above examples have mainly concerned inductive sensors which are inductive coils, but embodiments of the invention may comprise any type of inductive sensors.

According to embodiments of the invention with two inductive sensors, the inductive sensor signals of the two inductive sensors may be supplied to a processing unit, for example a type of signal processor, for example a digital signal processor. This processing unit may than provide a ratio of the inductive sensor signals, from which a representation of the position may be obtained by using a ratio-to-position transfer function.

According to embodiments of the invention, an inductive sensor signal magnitude may be determined based on the inductive sensor signals. The inductive sensor signal magnitude may be based on magnitudes of inductive sensor signals. It may, for example, be an average of inductive sensor signals or a quadratic mean. To obtain a representation of the voice coil position according to the invention, it may be advantageous to utilize an inductive sensor signal magnitude. For example, when the voice coil velocity $v_h$ is low, the voltage ratio of Eq. 3 and/or Eq. 10 may become imprecise or inaccurate and including an inductive sensor signal magnitude to determine the voice coil position may correct such imprecisions or inaccuracies.

The presented method for determining a voice coil position has many advantages compared to prior methods of voice coil position detection.

The method utilizes the magnetic field of magnetic circuit, which is a central component built into most voice coil systems, and the method is, thus, minimally dependent on the installation of additional components. By using ratios of inductive sensor signals, a velocity-independent measure is straightforwardly provided, in contrast to a system which relies on analyzing single inductive sensor signals.

The components required for implementing the method, e.g., inductive sensors, are easy to implement in standard voice coil systems. For example, inductive sensor coils may be printed directly onto a flexible printed circuit board, which may be wrapped around a voice coil. Embodiments according to the invention may, thus, also be robust and cheap to produce, compared to voice coil systems comprising other types of position detectors relying on the use of lasers or cameras.

The method according to the invention is not limited to function within a particular excursion range of the voice coil and may thus in principle be utilized for determining any voice coil position. To implement the method for a given voice coil system, the number of inductive sensors may be selected such that a desired accuracy of the determination of the voice coil position may be realized for any excursion of the voice coil.

Owing to the simplicity of the method, only a simple signal analysis is required for obtaining a representation of a voice coil position. This is particularly the case for embodiments of the invention where the method utilizes one inductive signal ratio from two inductive sensors. Here, the inductive sensor signal ratio may be the representation of a voice coil position, and the only signal processing required may thus be determining a ratio of two voltages.

There are several types of voice coil systems for which it may be advantageous to acquire a real-time measure of the voice coil position.

Generally, any voice coil may have a nonlinear response for sufficiently large excursions. A nonlinear response of a voice coil may be understood as nonlinear relation between the restoring force acting on the voice coil and the excursion of the voice coil and may typically be position dependent. Such a nonlinear response may introduce distortions to sound emitted by the loudspeaker of the voice coil. However, since embodiments of the invention permit a real-time position measurement, it is possible to implement a distortion correction algorithm in a loudspeaker which utilizes the method according to the present invention. Such an algorithm may correct any position dependent distortion.

The ability to determine a voice coil position may also be used as a diagnostics or analysis tool, to evaluate the performance of a voice coil system. This may be useful in a research-and-development setting, where measuring a voice coil position may be necessary in development of new loudspeaker technologies. It may also be useful in the configuration of a loudspeaker product. For example, the voice coil position may be measured over time to monitor whether the performance of the loudspeaker degrades. If this happens, a voice coil driving system may for example automatically compensate for the degraded performance or notify a user of the loudspeaker that a repair or replacement is needed.

Some specialized types of voice coil may even depend on determining a voice coil position to function properly. For example, some types of voice coils are segmented voice coils, in which a voice coil is segmented into several voice coil sections which may be driven independently. Then, preferably, only voice coil sections which contribute in generating an electromotive force may be powered and this may result in a reduced power consumption of the loudspeaker. Here, it is essential for the voice coil system to perform the independent driving of relevant individual voice coil sections, which depends crucially on obtaining a real-time measure of the voice coil position. In fact, such segmented voice coil systems require voice coil position to determine the relative motor strength of each voice coil section to determine the appropriate driving signal for each section. Using the outlined method based on position measurement with inductive sensors that are mechanically aligned or superimposed onto the driving coils provides a measurement of the relative field strength in one or more sections of a voice coil transducer, for example, a segmented voice coil transducer in a loudspeaker.

According to an embodiment of the invention said inductive sensors comprise inductive sensor coils.

The inductive sensors may be inductive sensor coils and each inductive sensor coil is arranged to detect a representation of a magnetic field or a change of magnetic field. Inductive sensor coils are advantageous in that they facilitate a robust and cheap way of detecting changes in a magnetic field.

According to embodiments of the invention, the inductive sensor coils may be printed on a printed circuit board, such as a flexible printed circuit board which may be wrapped around a voice coil. This facilitates an easy integration of the inductive sensor coils in a voice coil system. The inductive sensor coils may comprise metals such as copper.

According to an embodiment of the invention said inductive sensor coils comprises an equal number of loops of windings.

When the position of the voice coil is determined using inductive sensor coils, it may be advantageous to use the same number of turns of windings in each inductive sensor coil, since this simplifies the method of establishing the voice coil position. For example, if you have unequal length voice coil sections in a segmented voice coil transducer you may use inductive sensor coils of similar unequal ratio(s). When the number of loop windings are the same, the position of the voice coil may be determined independent of the number of loop windings for the inductive sensor coils.

However, in other embodiments of the invention, there may be situations where inductive sensor coils with varying size, shape, or windings are used to compensate for a particular physical construction of a transducer motor in order to provide the best signal-to-noise ratio of the measurement.

According to an embodiment of the invention said inductive sensor signals are voltage signals outputted from said inductive sensors respectively.

When using inductive sensor coils as inductive sensors, an inductive sensor signal may be a voltage measured across a corresponding inductive sensor coil. This voltage may then be processed to provide inductive sensor signal ratios. Using voltages from inductive sensors for processing ensures a simple processing scheme, which may be advantageous for many applications of the present invention. In some embodiments of the invention, voltages measured across individual inductive sensor coils may be buffered before being processed. Buffering a signal may be understood as implementing a type of electronic circuit in the signal path, which may isolate the input of the electronic circuit from the output of the electronic circuit.

According to an embodiment of the invention said inductive sensors comprise a third inductive sensor and said inductive sensor signals comprise a third inductive sensor signal based on an output from said third inductive sensor.

According to some embodiments of the invention a pair of inductive sensors may be utilized to determine a position of a voice coil of a loudspeaker. The precision or accuracy of the determination of the voice coil position may, according to embodiments of the invention, be improved by utilizing more than two inductive sensors, such as three, four, or five inductive sensors, because this enables providing more than two inductive sensor signals, for example three inductive sensor signals. Preferably, the inductive sensors are mechanically coupled to the voice coil, e.g., rigidly coupled to the voice coil, and are located at different positions on the voice coil along the travelling axis.

According to an embodiment of the invention said at least one inductive sensor signal ratio comprises a second inductive sensor signal ratio based on said second inductive sensor signal and said third inductive sensor signal.

The method may comprise determining two inductive sensor signal ratios and these may be used as basis for determining a representation of a voice coil position. Embodiments of the invention using two or more inductive sensor signal ratios may also include the use of at least two ratio-to-position transfer functions.

Even though it is possible to determine three unique inductive sensor signal ratios on basis of three inductive sensor signals, not included inverse ratios, it may for some applications be preferable to only determine two inductive sensor signal ratios during processing. This may provide a representation of a voice coil position, which is more accurate and/or precise than a representation based on a signal inductive sensor signal ratio, while not requiring the same amount of processing as determining three inductive sensor signal ratios.

In embodiments with more than two inductive sensors, such as three inductive sensors, more than one inductive sensor ratio may be determined, such as determined by a processing unit, e.g., a digital signal processor. For example, for a method with a first inductive sensor signal from a first inductive sensor, a second inductive sensor signal from a second inductive sensor, and a third inductive sensor signal from a third inductive sensor, a first inductive sensor ratio may be determined based on the first inductive sensor signal and the second inductive sensor signal, a second inductive sensor signal ratio may be determined based on the second inductive sensor signal and the third inductive sensor signal, and a third inductive sensor signal ratio may be determined based on the first inductive sensor signal and the third inductive sensor signal. Each of these three inductive sensor ratios may have difference ratio-to-transfer functions, and three representations of a position may then be calculated.

Representations of voice coil positions may also be referred to as unweighted voice coil positions or unweighted representations of voice coil positions. Preferably, a weighted voice coil position may then be determined based on the unweighted voice coil positions. This may be done by calculating a weighted average of the unweighted voice coil positions. The weights of the weighted average may preferably depend on the voice coil position, for example such that for some voice coil positions, a position based on a first inductive sensor signal ratio has the largest weight, whereas for some other voice coil position a second inductive sensor signal ratio has the largest weight. In some embodiments, the weighted average of the unweighted voice coil positions may refer to selecting one of the voice coil positions.

For an arbitrary number $n_s$ of inductive sensors, the number of different inductive sensor signal ratios may be $n_r = n_s(n_s-1)/2$, not including inverse ratios. In embodiments with $n_s$ inductive sensors, typically, up to $n_r$ inductive sensor ratios may be calculated in a processing unit, and a ratio-to-position transfer function may be applied to each of the inductive sensor ratios to provide unweighted voice coil positions. A weighted voice coil position may then be obtained by calculating a weighted average of the unweighted voice coil positions.

The invention is not restricted on any particular naming scheme or designation of, for example, inductive sensors, inductive sensor signals, inductive sensor signal ratios. One inductive sensor may thus for example be referred to as the first inductive sensor, but could in other embodiments be referred to as a top inductive sensor or inductive sensor A.

According to an embodiment of the invention said at least one inductive sensor signal ratio comprise a third inductive sensor signal ratio based on said first inductive sensor signal and said third inductive sensor signal.

The method may comprise determining three inductive sensor signal ratios and these may be used as basis for determining a representation of a voice coil position. In such situations where three inductive sensor signal ratios are used, the method may also include the use of one or more ratio-to-position transfer functions. Processing three inductive sensor signal ratios may provide a more accurate or precise representation of a voice coil position compared to only processing one or two inductive sensor signal ratios.

According to an embodiment of the invention said representation of said voice coil position is said at least one inductive sensor signal ratio.

The at least one inductive sensor signal ratio may be used directly as a representation of a voice coil position. This is particularly relevant when only two inductive sensors are utilized and only one inductive sensor signal ratio is determined. In this embodiment of the invention, any control of the voice coil system relying on the voice coil position may thus be carried out based on the inductive sensor signal ratio. For example, audio distortion compensation may be applied to the voice coil, if an inductive sensor signal ratio threshold is surpassed by the inductive sensor signal ratio. This may be advantageous since no ratio-to-position transfer function is required.

According to an embodiment of the invention said determining a representation of said voice coil position comprises applying a ratio-to-position transfer function to said at least one inductive sensor signal ratio to obtain at least one representation of said voice coil position.

By a ratio-to-position transfer function is understood a function or mapping which relates or maps an inductive sensor signal ratio to a representation of a voice coil position. The ratio-to-position transfer function may be a function which for any value of inductive sensor signal ratio is able to provide a corresponding value of voice coil position. It may be advantageous to convert at least one inductive sensor signal ratio into a voice coil position, and this may be performed by applying a ratio-to-position transfer function. Different inductive sensor signal ratios may have different ratio-to-position transfer functions, e.g. a first inductive sensor signal ratio may have a first ratio-to-position transfer function, whereas a second inductive sensor signal ratio may have a second ratio-to-position transfer function. By determining a voice coil position using a ratio-to-position transfer function, it may be possible to obtain a clear measurement of the voice coil position.

According to an embodiment of the invention said applying said ratio-to-position transfer function comprises comparing said at least one inductive sensor signal ratio with at least one corresponding ratio-to-position lookup table.

A ratio-to-position lookup table may be used to determine a voice coil position and may comprise a list of inductive sensor signal ratios and a list of corresponding voice coil positions, such that each inductive sensor signal ratio in the list of inductive sensor signal ratios may have a corresponding voice coil position in the list of voice coil positions. These lists may be generated in a calibration procedure of the voice coil, where other means or methods for measuring voice coil positions than the method according to this invention may be employed. The list of inductive signal sensor ratios may comprise ranges of inductive sensor signal ratios with corresponding voice coil positions. In this manner, every inductive sensor signal ratio determined on the basis of inductive sensor signals may lie within a range of the list having a corresponding voice coil position.

Any processing used in the method according to the present invention may preferably be performed by a processing unit which may be associated with a memory, such as communicatively connected to a memory, in which a ratio-to-position lookup table is stored. A ratio-to-position lookup table facilitates a simple and uncomplicated way of converting a given inductive sensor signal ratio into a specific voice coil position.

According to an embodiment of the invention said applying said ratio-to-position transfer function comprises comparing said at least one inductive sensor signal ratio with at least one corresponding ratio-to-position curve.

A ratio-to-position curve may be understood as a representation of a mathematical expression obtained in e.g. a fitting procedure, for example during a calibration procedure. In a calibration procedure of a voice coil system, other means or methods for measuring voice coil positions than the method according to this invention may be employed. An inductive sensor signal ratio may for example be converted into a representation of a voice coil position by using the mathematical expression of the ratio-to-position curve.

Any processing used in the method according to the present invention may preferably be performed by a processing unit which may be associated with a memory such as communicatively connected to a memory, in which a ratio-to-position curve is stored. A ratio-to-position curve facilitates a simple and uncomplicated way of converting a given inductive sensor signal ratio into a specific voice coil position.

According to an embodiment of the invention processing inductive sensor signals comprise determining an inductive sensor signal magnitude based on said inductive sensor signals.

An inductive sensor signal magnitude may be determined based on the inductive sensor signals. An inductive sensor signal magnitude may be based on magnitudes of inductive sensor signals, it may for example be a quadratic sum, a quadratic mean, or an average. It may be useful to determine an inductive sensor signal magnitude, for example to determine a representation of a voice coil position, since the voltage ratio of Eq. 3 and/or Eq. 10 may become imprecise or inaccurate when the voice coil velocity is low. In various embodiments of the invention, multiple inductive sensor signal magnitudes may be determined.

According to an embodiment of the invention said determining said representation of a voice coil position is based on said inductive sensor signal magnitude.

By an inductive sensor signal magnitude may also be understood a sensor signal strength. While a driving signal is applied to the voice coil, an inductive sensor signal magnitude may be large while the velocity of the voice coil is large, and small while the velocity of the voice coil is small. However, when the velocity of the voice coil is small, a voice coil position or a weighted voice coil position which is determined also on the basis of an inductive sensor signal magnitude may be more accurate than a voice coil position or weighted voice coil position which is not also based on an inductive sensor signal magnitude.

According to an embodiment of the invention, the voice coil position is determined on the basis of a weighted voice coil position and an inductive sensor signal magnitude. This may for example be done by introducing a magnitude threshold. The inductive sensor signal magnitude may for example represent a measure of the velocity of the voice coil. When a magnitude or strength of the inductive sensor signal is greater than the magnitude threshold, the voice coil position is the weighted voice coil position. However, when the inductive sensor signal is smaller than the magnitude threshold, a weighted voice coil position determined while the inductive sensor signal was larger than the magnitude threshold may be used as a voice coil position. As such, the voice coil position may not be updated while the voice coil velocity is small. For example, the voice coil position may not be updated while the voice coil velocity is small, e.g. while the inductive sensor signal magnitude is below a magnitude threshold. Most transducers will be at rest position when the velocity is near zero, and accordingly, this low velocity condition can potentially be used to determine or set a rest position of the voice coil. This may for example be implemented in an algorithm in a digital signal processor.

According to an embodiment of the invention said determining said representation of a voice coil position is based on feedback from a previously determined representation of a voice coil position.

The method according to the invention relates to determining a representation of a voice coil position. This method may rely on a previously determined representation of a voice coil position. A previously determined representation of a voice coil position may be understood as a representation of a voice coil position which has been determined previously.

In some embodiments, the weights used in a weighted average may for example rely on a previously determined representation of a voice coil position. In some embodiments, the determined representation of a voice coil position may be a previously determined representation of a voice coil position, for example if an inductive sensor signal magnitude is below a magnitude threshold. Utilizing a previously determined representation of a voice coil position may generally allow for better calculations or algorithms for determining a representation of a voice coil position.

According to an embodiment of the invention said at least one inductive sensor signal ratio is at least one unweighted inductive sensor signal ratio and said processing inductive sensor signals further comprises determining a weighted inductive sensor signal ratio based on said at least one unweighted inductive sensor signal ratio.

The method may involve determining multiple inductive sensor signal ratios. In order to provide a single representation of a voice coil position, a weighted average may be calculated to determine a weighted inductive sensor signal ratio, based on the multiple inductive sensor signal ratios. In this context, these multiple inductive sensor signal ratios may thus be referred to as unweighted inductive sensor signal ratios. The weights used to calculate the weighted average may depend on a representation of a voice coil position. As an example, for some voice coil positions, a first inductive sensor signal ratio may have a greater weight than others, whereas for some other voice coil positions, a second inductive sensor signal ratio may have a greater weight. The weighted average of the unweighted inductive sensor signal ratios may refer to selecting one of the inductive sensor signal ratios. A weighted inductive sensor signal ratio may be thought of as a representation of a voice coil position.

Determining a weighted inductive sensor signal ratio may be advantageous in that a greater precision in determining a voice coil position may be obtained compared to using a single unweighted inductive sensor signal. A further advantage by determining a weighted inductive sensor signal ratio and using it as a representation of a voice coil position is that the use of a ratio-to-position transfer function may be avoided.

According to an embodiment of the invention said at least one representation of a voice coil position is at least one unweighted voice coil position and wherein said method further comprises a step of determining a weighted voice coil position based on a weighted average of said at least one unweighted voice coil position.

According to some embodiments of the invention, a plurality of representations of a voice coil position are determined based on multiple inductive sensor signal ratios. In order to provide a single representation of a voice coil position, a weighted average may be calculated to determine a weighted voice coil position, based on the multiple voice coil positions. In this context, these multiple voice coil positions may thus be referred to as unweighted voice coil positions. The weights used to calculate the weighted average may depend on a representation of a voice coil position, e.g. for some voice coil positions, a first unweighted voice coil position may have a larger weight, whereas for some other voice coil positions, a second unweighted voice coil position may have a larger weight.

The weighted voice coil position may be regarded as the final determination of a voice coil position which may be used in different applications of the method. In a further embodiment of the invention the final determination of a voice coil position may additionally be based on an inductive sensor signal magnitude.

According to an embodiment of the invention said steps of processing said measured inductive sensor signals and determining a representation of said voice coil position is performed by a processing unit such as a digital signal processor.

Processing of inductive sensor signals and/or determining a representation of a voice coil position may be performed by a processing unit. A processing unit may be characterized by being able to perform any processing required according to the invention. It may for example be an analogue circuit or a signal processor, preferably a digital signal processer. In a preferred embodiment of the invention the processing unit is a digital signal processer.

According to an embodiment of the invention said measuring inductive sensor signals comprises buffering inductive sensor signals individually.

Inductive sensor signals from inductive sensors may be passed to a buffering unit before further processing. A buffering unit may be understood as an electronic circuit comprising an input terminal and an output terminal where the input terminal is electronically isolated from the output terminal. In this way, an inductive sensor signal characterized by e.g. a low signal strength or magnitude, which is passed on to the buffering unit for buffering before further processing, may not be compromised by other electronic components such as an analogue-to-digital converter (ADC). A buffering unit may buffer a signal and may for example be a unity gain buffer, voltage buffer, or digital buffer. Furthermore, a buffering unit may amplify or attenuate an inductive sensor signal to match its signal range to the next processing step, e.g. an inductive sensor voltage signal may be amplified to match the dynamical range of an analogue-to-digital converter.

Buffering inductive sensor signals is thus advantageous in that it may reduce the influence that any signal processing may impose on an inductive sensor signal. This ensures that even inductive sensor signals having a low strength or magnitude may be used for processing. For example, the buffered data may be filtered or otherwise pre-processed, before the position is determined to reduce noise and improve accuracy.

According to an embodiment of the invention said method comprises an additional step of applying audio distortion compensation based on said determined representation of said voice coil position.

In an embodiment of the invention method comprises an additional step of applying audio distortion compensation based on said weighted voice coil position.

A voice coil may have a non-linear response for large excursions, i.e. displacements, of the voice coil. This non-linear response may introduce distortions to sound emitted by the loudspeaker. However, since embodiments of the invention permits a real-time position measurement, it is possible to implement distortion compensation, such as an audio distortion correction algorithm. Such an algorithm may correct any position dependent distortion. As an example, a voice coil position-dependent gain may be applied to the driving signal of the voice coil, which may correct distortion.

According to an embodiment of the invention said voice coil comprises a plurality of voice coil sections.

A voice coil may be segmented into a plurality of voice coils sections, which may be driven independently by a corresponding plurality of independent driving signals. This may allow only providing a driving signal to voice coil sections which contribute substantially in generating an electromotive force. Such a voice coil may have a reduced power consumption compared to an un-segmented voice coil. Establishing a real-time representation of a voice coil position is essential in order to successfully use a segmented voice coil, and therefore determining a representation of a voice coil position according to embodiments of the present invention may be advantageous when using a segmented voice coil.

According to an embodiment of the invention said method comprises an additional step of selectively coupling said plurality of voice coil sections individually to said driving signal based on said determined representation of a voice coil position.

According to embodiments of the invention the voice coil comprises a plurality of voice coil sections, and a driving signal may be selectively coupled to individual voice coil sections based on the determined representation of a voice coil position. For example, when a determined voice coil position lies within a first range of voice coil positions a first voice coil section may be coupled, when a determined voice coil position lies within a second range of voice coil positions a second voice coil section may be coupled, and when a determined voice coil position lies within a third range of voice coil positions a third voice coil section may be coupled. The different ranges of voice coil positions may or may not overlap. If they overlap, more than one voice coil section may be coupled simultaneously. Embodiments of the invention are not restricted to a specific number of voice coil sections. When a voice coil section is not coupled, it may receive no signal, or it may receive a driving signal of reduced current.

According to an embodiment of the invention, said plurality of voice coil section comprises a first voice coil section and a second voice coil section associated with said first inductive sensor and said second inductive sensor, respectively; wherein said method comprises a step of determining relative electromotive force contributions of said plurality of voice coil sections based on said inductive sensor signals.

According to an embodiment of the invention, said determining relative electromotive force contributions comprises determining a first sectional electromotive force contribution based on said first inductive sensor signal and a second sectional electromotive force contribution based on said second inductive sensor signal.

In an exemplary embodiment, a voice coil is segmented into a first and a second voice coil section, and respective inductive sensors are positionally aligned along the travelling axis with each of the voice coil sections. These inductive sensor coils may then be used to determine the relative coupling or relative electromotive force contribution of each individual voice coil section of the segmented voice coil. With proper alignment of the inductive sensors, the ratio of force generated by each voice coil section, can be determined directly based on the ratio of inductive sensor signals from each of the inductive sensor signals. Hence, an accurate measure of the relative force of the voice coil sections can be determined by the ratio of the inductive sensor signals.

In other embodiments of the invention, the voice coil is segmented into three, four, five, or more than five voice coil sections, wherein a respective inductive sensor is positionally aligned along the travelling axis with each of the voice coil sections. In such embodiments, the ratio of force generated by each voice coil section, can be determined directly based on the ratio of inductive sensor signals from each of the inductive sensor signals, and an accurate measure of the relative force of the voice coil sections can be determined by the ratio of the inductive sensor signals.

Note that, in principle, determining relative electromotive force contributions and/or a first sectional electromotive force contribution is directly comparable to determining a voice coil position. If a voice coil position is known, it is possible to derive an electromotive force contribution, and if an electromotive force contribution is known, it is possible to derive a voice coil position. Thus, in some embodiments of the invention, the voice coil position is not determined directly, but instead an equivalent parameter, e.g., an electromotive force contribution, is determined.

An aspect of the invention relates to a voice coil system comprising:
 a magnetic circuit having a magnetic gap and a voice coil suspended in said magnetic gap;
 a plurality of inductive sensors mechanically coupled to said voice coil, said plurality of inductive sensors comprising a first inductive sensor and a second inductive sensor; and
 a processing unit arranged to:
  receive inductive sensor signals, said inductive sensor signals comprise a first inductive sensor signal based on an output from said first inductive sensor, and said inductive sensor signals comprise a second inductive sensor signal based on an output from said second inductive sensor,
  determine at least one inductive sensor signal ratio based on said inductive sensor signals, said at least one inductive sensor signal ratio comprising a first inductive sensor signal ratio based on said first inductive sensor signal and said second inductive sensor signal; and
  determine a representation of a voice coil position based on said at least one inductive sensor signal ratio.

A voice coil system is understood as a system including a voice coil, which may be included in a loudspeaker comprising a loudspeaker diaphragm which is actuated by reciprocations of the voice coil to produce acoustic sounds. When a driving signal is applied to the voice coil, an electromotive force may be generated, due to the magnetic field in the magnetic gap in which the voice coil may reciprocate. The voice coil may mainly reciprocate along a travelling axis.

The voice coil system according to the invention may further comprise inductive sensors capable of providing inductive sensor signals which may be processed to determine inductive sensor signal ratios, upon which a representation of a voice coil position may be determined.

According to an embodiment of the invention said plurality of inductive sensors further comprise a third inductive sensor and wherein said inductive sensor signals comprise a third inductive sensor signal based on an output from said third inductive sensor.

According to an embodiment of the invention said plurality of inductive sensors comprise inductive sensor coils.

The inductive sensors of the voice coil system may be inductive sensor coils mechanically coupled, such as rigidly coupled, to the voice coil.

According to an embodiment of the invention said inductive sensor coils comprises an equal number of loops of windings.

When the position of the voice coil is determined using inductive sensor coils, it may be advantageous to use the same number of loops of windings in each inductive sensor coil, since this simplifies the method of establishing the voice coil position. When the number of loop windings are the same, the position of the voice coil may be determined independent of the number of loop windings for the inductive sensor coils.

According to an embodiment of the invention said inductive sensor sensors are inductive sensor coils wound around said voice coil and said travelling axis.

According to an embodiment of the invention said processing unit is a digital signal processor.

The processing unit may be a digital signal processor such as a microprocessor, microcontroller, FPGA (Field Programmable Gate Array) or an ASIC (Application-specific Integrated Circuit), etc. The processing unit may be a dedicated processor for the purpose of the present application or be a general-purpose processor performing additional tasks to the signal processing of audio signals.

In an alternative embodiment of the invention the processing unit is an analog processing unit comprising one or more analog circuits.

According to an embodiment of the invention said voice coil system comprises one or more buffering units arranged to provide said inductive sensor signals based on outputs from said plurality of inductive sensors.

In some preferred embodiments, a signal from an inductive sensor may be passed to a buffering unit before being passed to the processing unit. A buffering unit may buffer a signal and may for example be a unity gain buffer, voltage buffer, or digital buffer.

According to an embodiment of the invention said inductive sensors comprise inductive sensor directions such that each individual inductive sensor of said inductive sensors comprise an individual inductive sensor direction.

An inductive sensor may have an inductive sensor direction, in which it is most sensitive to the magnetic field or changes of the magnetic field. An inductive sensor direction may also be referred to as an inductive sensor axis of an inductive sensor.

According to an embodiment of the invention said inductive sensors are arranged such that said inductive sensor directions are approximately orthogonal to said travelling axis.

Each of the inductive sensors may be arranged on the voice coil such that the inductive sensor direction of each of the inductive sensors is orthogonal to the travelling axis. Orthogonal may also be understood as perpendicular. Preferably, each inductive sensor may be arranged such that each inductive sensor axis intersects the voice coil, preferably such that each inductive sensor axis is substantially close to the travelling axis. This arrangement of inductive sensors may for example determine a voice coil position according to Eq. 5.

Such an arrangement of inductive sensors may be advantageous in that the inductive sensors are then most sensitive to the magnetic field of the magnetic gap. Some inductive sensor may have multiple sensitivity directions. In such cases, it may be preferable that at least one of the sensitivity directions is arranged orthogonally to the travelling axis and preferably such that each inductive sensor axis intersects the voice coil.

According to an embodiment of the invention said inductive sensors are arranged such that each said individual inductive sensor direction is approximately parallel to the direction of the travelling axis.

In some preferred embodiments of the invention, the inductive sensors may be arranged to be approximately or substantially parallel to the direction of the travelling axis. As an example, an inductive sensor in the form of an inductive sensor coil may be wound around the voice coil and the travelling axis. Alternatively, an inductive sensor coil may be wound within the voice coil, around the travelling axis. This arrangement of inductive sensors may for example determine a voice coil position according to Eq. 12.

According to an embodiment of the invention said inductive sensor sensors are inductive sensor coils wound around said voice coil and said travelling axis.

This arrangement of inductive sensor coils may for example be useful for determining a voice coil position according to Eq. 12.

According to an embodiment of the invention each individual inductive sensor of said inductive sensors is arranged to register a signal when a driving signal is applied to said voice coil.

In some embodiments of the invention, each individual inductive sensor may be arranged to register a signal when a driving signal is applied to the voice coil, and, preferably, each individual inductive sensor may additionally register a signal when it traverses the magnetic gap region. This may for instance be the case if an inductive sensor is an inductive sensor coil, wound around the voice coil.

This arrangement of inductive sensors may for example determine a voice coil position according to Eq. 12.

According to an embodiment of the invention said inductive sensors are located on a printed circuit board such as a flexible printed circuit board.

A printed circuit board may be understood to be a type of component, which may mechanically and electrically connect electrical components. The circuit board may be flexible such that it is suitable for wrapping at least partially such as fully around a circumference of a voice coil and its travelling axis. A flexible circuit board may be based on copper clad foil. A printed circuit board or a flexible printed circuit board is advantageous in that it may easily facilitate inductive sensor coils and be fitted into most voice coil systems.

According to an embodiment of the invention said printed circuit board forms a tube segment and said voice coil is wound around said printed circuit board and said travelling axis.

The printed circuit board or flexible printed circuit board may form a segment of a tube which allows it to fit within a wound voice coil in most voice coil systems.

According to an embodiment of the invention said printed circuit board forms a tube segment and said voice coil is wound inside said printed circuit board and around said travelling axis.

The printed circuit board or flexible printed circuit board may form a segment of a tube, which allows it to fit around a wound voice coil in most voice coil systems.

According to an embodiment of the invention the voice coil system is arranged to carry out the method for determining a voice coil position of a voice coil according to any of the above described embodiments.

An aspect of the invention relates to a loudspeaker comprising:
- a diaphragm;
- an interface configured to receive an audio signal; and
- a voice coil system.

A diaphragm is understood to be a membrane attached to the voice coil, such that the reciprocation of the voice coil within the magnetic gap translates into a reciprocation of the membrane which then produces an acoustic sound.

The audio signal may be provided from an external unit such as an audio source arranged to output an electrical audio signal and with connecting means to deliver the audio signal to the loudspeaker. Examples of connecting means are wired connections such as a cabled connection and wireless connections such as a Bluetooth connection, e.g., Bluetooth A2DP or Bluetooth aptX, or a Wi-Fi connection.

An interface is understood to be a point of reception of an audio signal. The interface may be arranged to receive an audio signal, which is transmitted wirelessly, or to receive an audio signal via a wired connection, such as via a jack connection or minijack connection.

A loudspeaker as described herein may inherit all the advantages and benefits as described above in relation to the method of driving a voice coil. As such, a loudspeaker according to the present invention may provide the beneficial effect of low power consumption and reduction of excessive heating within the loudspeaker due to the efficiency of the segmented voice coil of the voice coil driving system.

According to an embodiment of the invention the loudspeaker comprises an audio amplifier.

In various embodiments of the invention, the loudspeaker comprises an audio amplifier. A driving signal provided to a voice coil may typically be based on output from an audio amplifier, which is based on a received audio signal.

In an embodiment, an amplifier may be integrated with the signal processor. In an embodiment, the amplifier is a Class-AB amplifier, but the invention is not limited to this example. In various embodiments, additional signal filtering, e.g., low pass filtering, may be applied before or after the amplifier.

THE DRAWINGS

Figure 3:
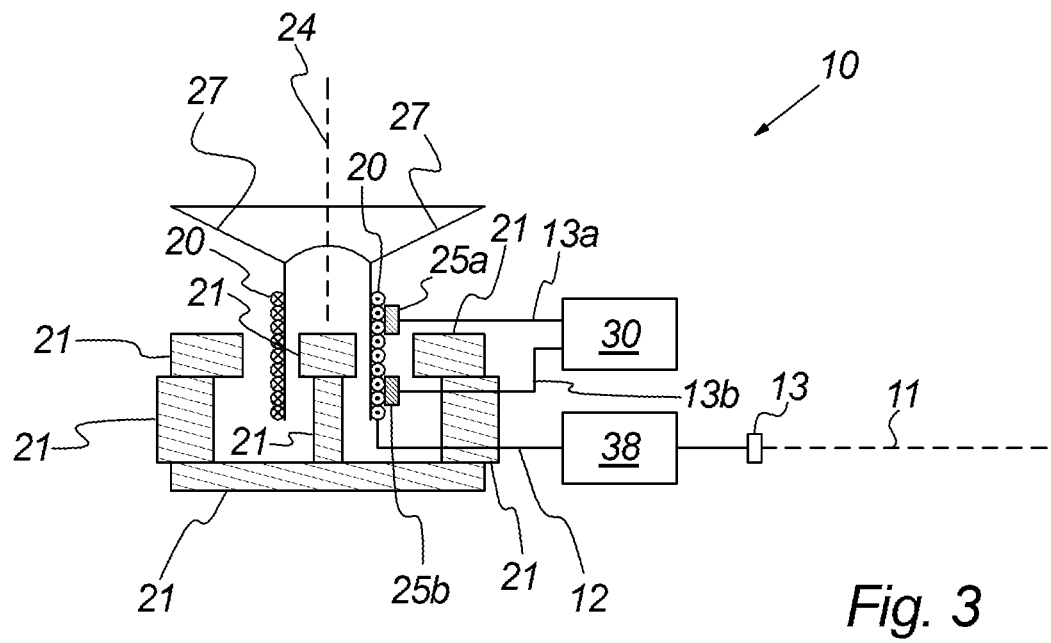
Figure 4:
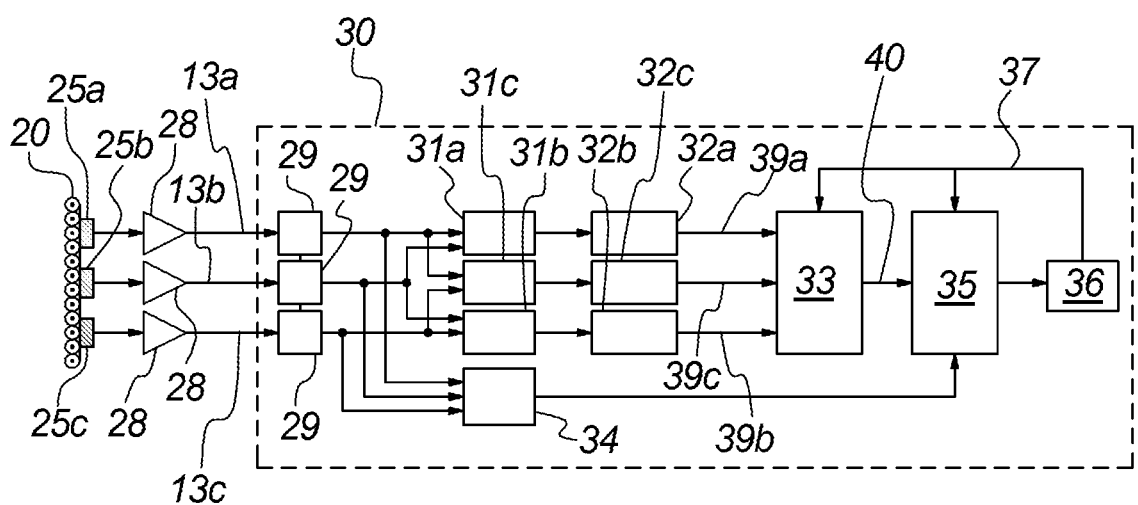
Figure 5:
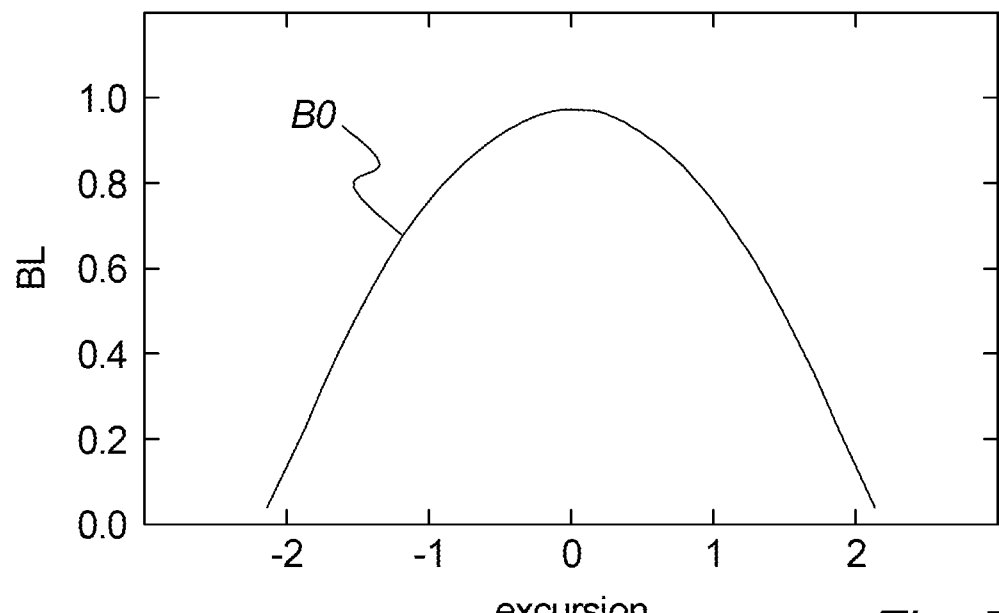
Figure 6:
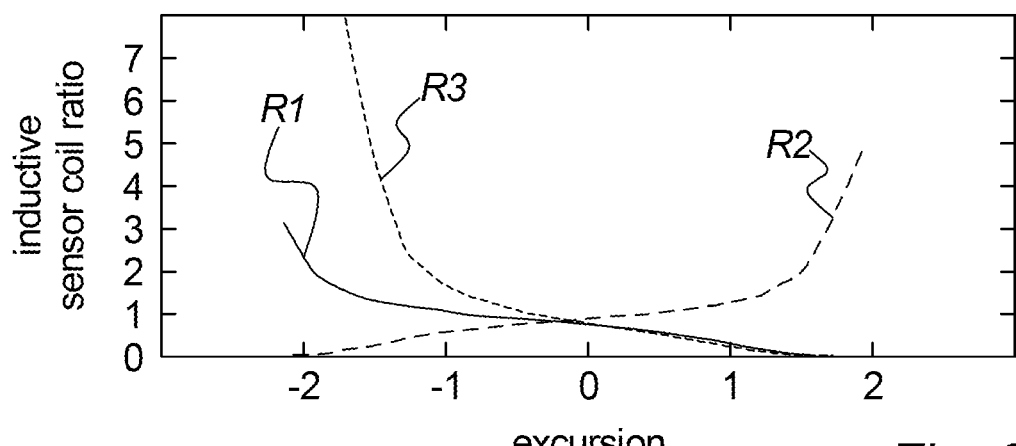

Various embodiments of the invention will in the following be described with reference to the drawings where FIG. 1 illustrates a voice coil system according to an embodiment of the invention;

FIG. 2a-d illustrate various embodiments of the invention, with different inductive sensor configurations;

FIG. 3 illustrates a loudspeaker receiving an audio signal according to an embodiment the invention;

FIG. 4 illustrates a detailed view of a method of determining a representation of a voice coil position according to various embodiments of the invention, FIG. 5 illustrates the capability of the voice coil to generate an electromotive force, which may be associated with the magnetic field of the magnetic gap, relevant to the method of the invention; and FIG. 6 illustrates exemplary representations of inductive sensor signal ratios, according to various embodiments of the invention.

DETAILED DESCRIPTION

FIG. 1 illustrates a voice coil system 50 according to an embodiment of the invention. The voice coil system 50 comprises a magnetic circuit 21 formed by two concentrically aligned magnetic circuit components 21, which may be permanent magnets or metal poles. The magnetic circuit is arranged such that a circular magnetic gap is formed within the magnetic circuit 21 terminated by the two magnetic circuit components. The circular magnetic gap is a volume of air which takes on the form of a volume disposed between two axially aligned cylinders of different widths. The magnetic gap, which may also be referred to as an air gap, may thus be described by a magnetic gap height 22 and a magnetic gap width 23 as indicated in the figures. For sake of simplicity, the magnetic gap height 22 and magnetic gap width 23 is only indicated on the left-hand side of the center magnetic circuit component 21, however, the magnetic gap is symmetrical around this center magnetic circuit component 21 and, thus, the same dimensions apply to the right-hand side.

The voice coil system 50 further comprises a voice coil 20, which is suspended within the magnetic gap 22, 23. The voice coil 20 comprises a plurality of metal windings coiling around the inner magnetic circuit segment and a travelling axis 24, which the voice coil 20 may travel along when a driving signal 12 is applied to the voice coil.

As would be understood by one of ordinary skill in the art, several alternative voice coil 20 and magnetic circuit 21 configurations are known in the technical field of loudspeakers and acoustic transducers, having other configurations of magnetic circuits 21 and magnetic gaps 22, 23, including various configurations of permanent magnets, pole pieces, front and back plates, casing, and various configurations of magnetic gaps 22, 23, including circular as described above, linear, polygonal, irregular, one or several magnetic gaps, etc. The present invention as defined by the claims is thereby not limited to the magnetic circuit 21 and magnetic gap 22, 23 configurations illustrated in the drawings but may readily be applied to other voice coil-based transducers by one of ordinary skill in the art.

The voice coil is mechanically coupled, i.e., rigidly coupled, to a first inductive sensor 25a arranged to provide a first inductive sensor signal 13a and a second inductive sensor 25b arranged to provide a second inductive sensor signal 13b. The coupling of the inductive sensors 25a-b to the voice coil 20 ensures that movements of the voice coil 20 are synchronous with movements of the inductive sensors 25a-b. Based on the inductive sensor signals 13a-b, a first inductive sensor signal ratio is determined 31a and, based on this, a representation of a voice coil position 26 is determined.

When the voice coil 20 reciprocates, the inductive sensors 25a-b may move relatively to a magnetic field of the magnetic gap 22, 23, and the ratio of the inductive sensor signals 25a, 25b may thus be voice coil-position dependent. Each position of the voice coil 20 may thus be associated with a unique value of the first inductive sensor signal ratio 31a. By calibrating the voice coil system 50 and determining the first inductive sensor signal ratio 31a for each position of the voice coil 50 in the magnetic gap, a representation of the position of the voice coil may thus be established by measurements of inductive sensor signals 25a-b and a determination of the first inductive sensor signal ratio 31a.

In this embodiments of the invention, the first inductive sensor signal ratio 31a may directly be regarded as the representation of a voice coil position 26, whereas in other embodiments of the invention, a ratio-to-position transfer function may be applied to the first inductive sensor signal ratio 31a to provide a representation of a voice coil position 26.

The voice coil 20 of this embodiment comprises a single coil of wire, however, in other embodiments of the invention, the voice coil may be a segmented voice coil comprising voice coil segments which may be powered by individual driving signals. Such a voice coil may provide a greater utilization of the electrical power applied to the voice coil.

Figures 2A, 2B:
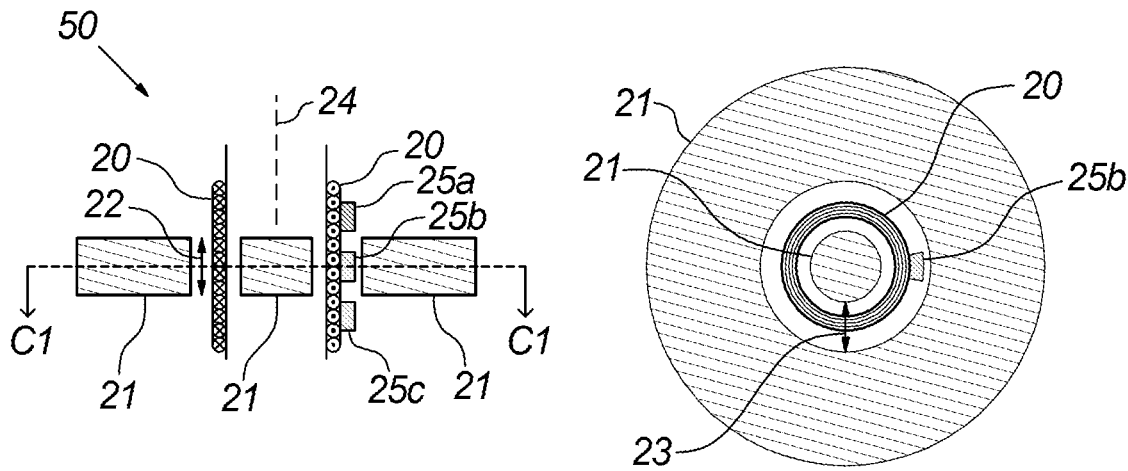

FIGS. 2*a*-*d* illustrate various embodiments of the invention, with different inductive sensor configurations. FIGS. 2*a* and 2*b* show different cut-through views of a configuration of inductive sensors according to an embodiment. As seen in FIG. 2*a*, the voice col system 50 comprises three inductive sensors 25; a first inductive sensor 25*a*, a second inductive sensor 25*b* and a third inductive sensor 25*c*. The inductive sensors 25*a*-*c* are arranged on the voice coil 20 and are mechanically coupled, i.e. rigidly coupled, to the voice coil 20. As seen in the figures, the inductive sensors 25*a*-*c* are distributed at various positions on the voice coil 20. The inductive sensors 25*a*-*c* of this embodiment comprises inductive sensor coils, however in other embodiments of the invention, the inductive sensors may comprise other sensor types. A cut through plane is indicated by the dashed line C1-C1 in FIG. 2*a* and the corresponding view seen from this cut through plane is shown in FIG. 2*b*.

FIG. 2*b* shows the same voice coil system 50 as in FIG. 2*a* from a different perspective. As seen, the magnetic circuit comprises two coaxially aligned magnetic circuit elements 21, and the voice coil 20 is arranged in the magnetic gap between the two. The magnetic gap has a magnetic gap width 23. As also seen in the figure is the second inductive sensor 25*b*, and the two other inductive sensors 25*a* and 25*c* (not shown in the figure) are located on either side of the second inductive sensor 25*b* as seen in a direction going through the figure.

The inductive sensors 25*a*-*c* of the embodiment of FIGS. 2*a*-*b* are arranged in an orientation relative to the travelling axis 24 such that the direction in which they are most sensitive to the magnetic field within the magnetic gap is perpendicular to the travelling axis 24.

Figures 2C, 2D:
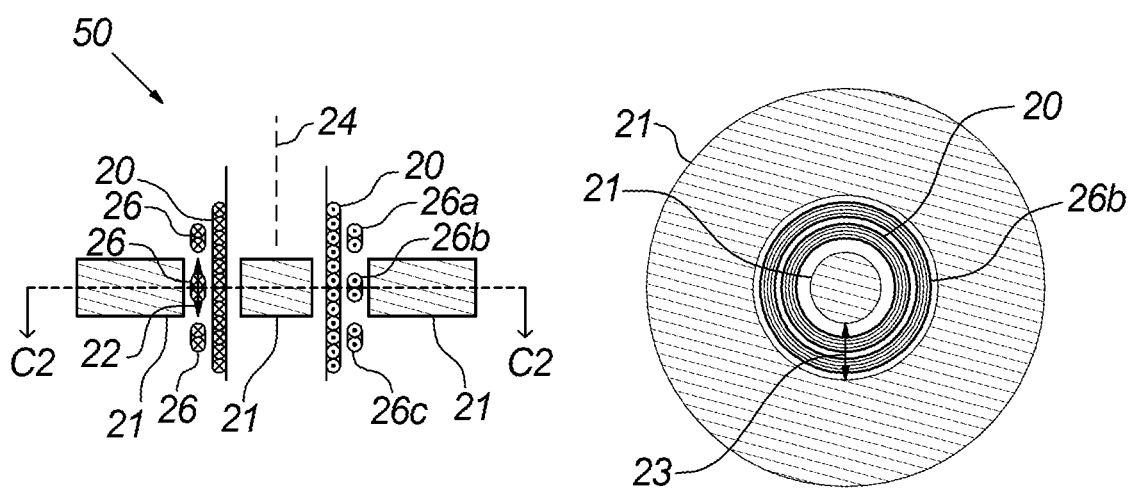

The embodiment shown in FIG. 2*c*-2*d* comprises three inductive sensor coils 26*a*-*c*; a first inductive sensor coil 26*a*, a second inductive sensor coil 26*b*, and a third inductive sensor coil 26*c*. A cut through plane is indicated by the dashed line C2-C2 in FIG. 2*c* and the corresponding view seen from this cut through plane is shown in FIG. 2*d*.

As illustrated, these inductive sensor coils 26*a*-*c* are wound around the voice 20 and the travelling axis 24.

FIG. 3 illustrates a loudspeaker 10, or at least components of a loudspeaker 10, receiving an audio signal 11 according to an embodiment the invention. An audio signal 11 is provided to an interface 13 of the loudspeaker. The interface may be arranged to receive an audio signal 11 via a wireless connection or via a wired connection. From here, the audio signal 11 may be passed to an audio signal processing unit 38, which may for example process the signal by filtering and/or by amplifying. However, embodiments of the invention do not necessarily require an audio signal processing unit 38. Based on the audio signal 11, a driving signal 12 is provided to the voice coil 20. The driving signal 12 may be a signal based on a processing of the audio signal 11, or it may alternatively be the audio signal 11 itself. Depending on the current of the driving signal 12 and the magnetic field of the magnetic gap of the magnetic circuit 21, the voice coil 20 may reciprocate along a travelling axis 24. When the voice coil 20 reciprocates, it pushes onto a diaphragm 27, which pushes air and thereby generates acoustic sound pressure waves to reproduce the audio signal 11 as audible sound.

The voice coil is mechanically coupled to a first inductive sensor 25*a*, which provides a first inductive sensor signal 13*a*, and a second inductive sensor 25*b*, which provides a second inductive sensor signal 13*b*. These inductive sensor signals 13*a*,13*b* are provided to a processing unit 30, which may process the signals to determine a representation of a voice coil position 36.

FIG. 4 illustrates a detailed view of a method of determining a representation of a voice coil position according to an embodiment of the invention. Here, a voice coil 20 is mechanically coupled to three inductive sensors such as three inductive sensor coils; a first inductive sensor 25*a*, a second inductive sensor 25*b*, and a third inductive sensor 25*c*. The first inductive sensor 25*a* is used to provide a first inductive sensor signal 13*a*, the second inductive sensor 25*b* is used to provide a second inductive sensor signal 13*b*, and the third inductive sensor 25*c* is used to provide a third inductive sensor signal 13*c*. Each of these signals are provided by use of buffering units 28, which are arranged to isolate their input from the inductive sensors 25*a*-*c* from their outputs.

The inductive sensor signals 13*a*-*c* are provided to a processing unit 30, for example a digital signal processor. In this embodiment, the inductive sensor signals 13*a*-*c* are each passed to an analog-to-digital converter 29, or simply AD-converter, included in the processing unit 30. In other embodiments of the invention, the analog-to digital converters 29 are separate to the processing unit. The analog-to-digital converters 29 provide a digital representation of the inductive sensor signals 13*a*-*c* and based on these digitalized representations of inductive sensor signals, three ratios are generated: a first inductive sensor signal ratio 31*a* based on the first inductive sensor signal 13*a* and the second inductive sensor signal 13*b*, a second inductive sensor signal ratio 31*b* based on the second inductive sensor signal 13*b* and the third inductive sensor signal 13*c*, and a third inductive sensor signal ratio 31*c* based on the first inductive sensor signal 13*a* and the third inductive sensor signal 13*c*.

Additionally, based on the inductive sensor signals 13*a*-*c*, an inductive sensor signal magnitude 34 may be determined, e.g., as a sum of magnitudes of the inductive sensor signals 13*a*-*c*.

A ratio-to-position transfer function 32*a*-*c* is applied to each of the inductive sensor signal ratios 31*a*-*c* to generate unweighted representations of voice coil positions 39*a*-*c*. Based on this, a position weighting 33 is performed to determine a weighted representation of a voice coil position 40.

Based on the weighted representation of a voice coil position 40 and the inductive sensor signal magnitude 34, a voice coil position determination 35 is be performed to provide a representation of a voice coil position 36.

The position weighting 33 and the voice coil position determination 35 may depend on feedback 37 from a previously determined representation of a voice coil position 36.

Furthermore, the invention is not restricted to the exemplary illustration of signal processing shown in FIG. 4. One of ordinary skill in the technical field of voice coil systems or signal processing may utilize the method of the invention in many various embodiments, which may or may not include a combination of processing elements as shown in FIG. 4.

FIG. 5 illustrates the capability of the voice coil to generate an electromotive force, which may be associated with the magnetic field of the magnetic gap, relevant to the method of the invention.

The magnitude of an electromotive force generated on a voice coil by running a current through the voice coil in a magnetic field may depend on the total length of current-carrying wire within the magnetic field, and the strength of the magnetic field. The product of the length of wire within the magnetic field and the magnitude of the magnetic field may thus describe the capability of a voice coil, or a voice coil section, to generate an electromotive force, and may be referred to as BL. This parameter may vary with the voice coil excursion since a current-carrying wire may leave or enter a magnetic field region.

The curve B0 in FIG. 5 shows a simulated BL for an exemplary embodiment of the invention for a range of excursions. The BL value is largest when the excursion is 0, i.e., when the voice coil 20 is in its natural resting position in the middle of the magnetic gap, and decreases gradually if the excursion is increased or decreased away from 0, i.e., as the voice coil is moved out of the magnetic gap, its capability to generate an electromotive force is gradually lost.

FIG. 6 illustrates exemplary representations of inductive sensor signal ratios, according to various embodiments of the invention. The curves have been obtained through a simulation which is based on inductive sensor signals from three inductive sensor coils located on a voice coil based on the simulated curve B0 shown in FIG. 5.

The three inductive sensor coils are arranged such that their inductive sensor axis (not shown in the figures) is orthogonal to the travelling axis, such that they individually pick up no substantial part of the driving signal, but such that they individually register a signal from the magnetic gap when they traverse the magnetic gap.

The three inductive sensor coils may for example be located similarly to those shown in FIG. 2a and FIG. 4.

The three curves R1-R3 are representations of a first inductive sensor signal ratio R1, a second inductive sensor signal ratio R2, and a third inductive sensor signal ratio R3. As the simulated results show, each individual ratio may serve as a basis for determining a representation of a voice coil position, e.g. for the first inductive sensor signal ratio R1, each value of the inductive sensor signal ratio corresponds to a unique excursion. A representation of a voice coil position may thus be determined based on one or more of these ratios.

A ratio-to-position transfer function may be established based on measuring a ratio, e.g., the first inductive sensor signal ratio R1, while measuring the voice coil excursion independently.

LIST OF REFERENCE SIGNS

10 Loudspeaker
11 Audio signal
12 Driving signal
13 Interface
13a-b Inductive sensor signals
20 Voice coil
21 Magnetic circuit component
22 Magnetic gap height
23 Magnetic gap width
24 Travelling axis
25a-c Inductive sensors
26 Voice coil position
26a-c Inductive sensor coils
27 Diaphragm
28 Buffering unit
29 Analog-to-digital converter
30 Processing unit
31a-c Inductive sensor signal ratios
32a-c Ratio-to-position transfer functions
33 Position weighting
34 Inductive sensor signal magnitude
35 Voice coil position determination
36 Representation of voice coil position
37 Feedback
38 Audio signal processing unit
39a-c Unweighted representations of voice coil positions
40 Weighted representation of voice coil position
50 Voice coil system
B0 BL
R1-R3 Inductive sensor coil ratios

The invention claimed is:

1. A method for determining a voice coil position of a voice coil, comprising:
    providing a magnetic circuit having a magnetic gap and suspending said voice coil in said magnetic gap, wherein said voice coil comprises a plurality of voice coil sections which are driven independently and individually;
    selectively applying a driving signal individually to said plurality of voice coil sections of said voice coil to produce an electromotive force moving said voice coil along a travelling axis;
    providing inductive sensors, said inductive sensors being mechanically coupled to said voice coil, said inductive sensors comprising:
        a first inductive sensor; and
        a second inductive sensor;
    measuring inductive sensor signals, said inductive sensor signals comprising a first inductive sensor signal based on an output from said first inductive sensor and a second inductive sensor signal based on an output from said second inductive sensor;
    processing said inductive sensor signals, said processing comprising determining at least one inductive sensor signal ratio based on said inductive sensor signals, said at least one inductive sensor signal ratio comprising a first inductive sensor signal ratio based on said first inductive sensor signal and said second inductive sensor signal, without based on the sum of said first inductive sensor signal and said second inductive sensor signal; and
    determining a representation of said voice coil position based on said at least one inductive sensor signal ratio.

2. The method for determining a voice coil position of a voice coil of claim 1, wherein said inductive sensors comprise inductive sensor coils.

3. The method for determining a voice coil position of a voice coil of claim 2, wherein said inductive sensor coils comprise an equal number of loops of windings.

4. The method for determining a voice coil position of a voice coil of claim 1, wherein aid inductive sensor signals are voltage signals outputted from said inductive sensors, respectively.

5. The method for determining a voice coil position of a voice coil of claim 1 wherein said inductive sensors comprise a third inductive sensor and said inductive sensor signals comprise a third inductive sensor signal based on an output from said third inductive sensor.

6. The method for determining a voice coil position of a voice coil of claim 5, wherein said at least one inductive sensor signal ratio comprises a second inductive sensor signal ratio based on said second inductive sensor signal and said third inductive sensor signal.

7. The method for determining a voice coil position of a voice coil of claim 6, wherein said at least one inductive sensor signal ratio comprises comprise a third inductive sensor signal ratio based on said first inductive sensor signal and said third inductive sensor signal.

8. The method for determining a voice coil position of a voice coil of claim 1, wherein said representation of said voice coil position is said at least one inductive sensor signal ratio.

9. The method for determining a voice coil position of a voice coil of claim 1, wherein said determining a representation of said voice coil position comprises applying a ratio-to-position transfer function to said at least one inductive sensor signal ratio to obtain at least one representation of said voice coil position.

10. The method for determining a voice coil position of a voice coil of claim 9, wherein said applying said ratio-to-position transfer function comprises comparing said at least one inductive sensor signal ratio with at least one corresponding ratio-to-position lookup table.

11. The method for determining a voice coil position of a voice coil of claim 9, wherein said applying said ratio-to-position transfer function comprises comparing said at least one inductive sensor signal ratio with at least one corresponding ratio-to-position curve.

12. The method for determining a voice coil position of a voice coil of claim 1, wherein said processing inductive sensor signals comprises determining an inductive sensor signal magnitude based on said inductive sensor signals.

13. The method for determining a voice coil position of a voice coil of claim 12, wherein said determining said representation of a voice coil position is based on said inductive sensor signal magnitude.

14. The method for determining a voice coil position of a voice coil of claim 1, wherein said determining said representation of said voice coil position is based on feedback from a previously determined representation of said voice coil position.

15. The method for determining a voice coil position of a voice coil of claim 1, wherein said at least one inductive sensor signal ratio is at least one unweighted inductive sensor signal ratio and said processing inductive sensor signals further comprises determining a weighted inductive sensor signal ratio based on said at least one unweighted inductive sensor signal ratio.

16. The method for determining a voice coil position of a voice coil of claim 1, wherein said at least one representation of a voice coil position is at least one unweighted voice coil position, and wherein said method further comprises determining a weighted voice coil position based on a weighted average of said at least one unweighted voice coil position.

17. The method for determining a voice coil position of a voice coil of claim 1, wherein said processing said measured inductive sensor signals and said determining said representation of said voice coil position is performed by a processing unit.

18. The method for determining a voice coil position of a voice coil of claim 1, wherein said measuring inductive sensor signals comprises buffering inductive sensor signals individually.

19. The method for determining a voice coil position of a voice coil of claim 1, further comprising applying audio distortion compensation based on said representation of said voice coil position.

20. The method for determining a voice coil position of a voice coil of claim 1, further comprising selectively coupling said plurality of voice coil sections individually to said driving signal based on said representation of said voice coil position.

21. The method for determining a voice coil position of a voice coil of claim 1, wherein said plurality of voice coil sections comprises: a first voice coil section associated with said first inductive sensor; and a second voice coil section associated with said second inductive sensor, and wherein said method further comprises determining relative electromotive force contributions of said plurality of voice coil sections based on said inductive sensor signals.

22. The method for determining a voice coil position of a voice coil of claim 21, wherein said determining relative electromotive force contributions comprises determining a first sectional electromotive force contribution based on said first inductive sensor signal and a second sectional electromotive force contribution based on said second inductive sensor signal.

23. A voice coil system, comprising:
a magnetic circuit, comprising:
a magnetic gap; and
a voice coil suspended in said magnetic gap, wherein said voice coil comprises a plurality of voice coil sections which are driven independently and individually;
a plurality of inductive sensors mechanically coupled to said voice coil, said plurality of inductive sensors comprising a first inductive sensor and a second inductive sensor; and
a processing unit configured to perform the method of claim 1.

24. A voice coil system, comprising:
a magnetic circuit, comprising:
a magnetic gap; and
a voice coil suspended in said
magnetic gap, wherein said voice coil comprises a plurality of
voice coil sections which are driven independently and individually;
a plurality of inductive sensors mechanically coupled to said voice coil, said plurality of inductive sensors comprising a first inductive sensor and a second inductive sensor; and
a processing unit configured to:
selectively applying a driving signal individually to said plurality of voice coil sections of said voice coil to produce an electromotive force moving said voice coil along a travelling axis;
receive inductive sensor signals, said inductive sensor signals comprising a first inductive sensor signal based on an output from said first inductive sensor, and said inductive sensor signals comprising a second inductive sensor signal based on an output from said second inductive sensor;
determine at least one inductive sensor signal ratio based on said inductive sensor signals, said at least one inductive sensor signal ratio comprising a first inductive sensor signal ratio based on said first inductive sensor signal and said second inductive sensor signal, without based on the sum of said first inductive sensor signal and said second inductive sensor signal; and determine a representation of a voice coil position based on said at least one inductive sensor signal ratio.

25. The voice coil system of claim 24, wherein said plurality of inductive sensors further comprise a third inductive sensor, and wherein said inductive sensor signals comprise a third inductive sensor signal based on an output from said third inductive sensor.

26. The voice coil system of claim 24, wherein said plurality of inductive sensors comprise inductive sensor coils.

27. The voice coil system of claim 26, wherein said inductive sensor coils comprises an equal number of loops of windings.

28. The voice coil system of claim 24, wherein said inductive sensors are inductive sensor coils wound around said voice coil and said travelling axis.

29. The voice coil system of claim 24, wherein said processing unit is a digital signal processor.

30. The voice coil system of claim 24, further comprising one or more buffering units arranged to provide said inductive sensor signals based on outputs from said plurality of inductive sensors.

31. The voice coil system of claim 24, wherein said inductive sensors comprise inductive sensor directions such that each individual inductive sensor of said inductive sensors comprises an individual inductive sensor direction.

32. The voice coil system of claim 31, wherein said inductive sensors are arranged such that said inductive sensor directions are approximately orthogonal to said travelling axis.

33. The voice coil system of claim 31, wherein said inductive sensors are arranged such that each of said inductive sensor directions is parallel to the direction of the travelling axis.

34. The voice coil system of claim 33, wherein said inductive sensors are inductive sensor coils wound around said voice coil and said travelling axis.

35. The voice coil system of claim 24, wherein each individual inductive sensor of said inductive sensors is arranged to register a signal when a driving signal is applied to said voice coil.

36. The voice coil system of claim 24, wherein said inductive sensors are located on a printed circuit board such as a flexible printed circuit board.

37. The voice coil system of claim 24, wherein said printed circuit board forms a tube segment and said voice coil is wound around said printed circuit board and said travelling axis.

38. The voice coil system of claim 24, wherein said printed circuit board forms a tube segment and said voice coil is wound inside said printed circuit board and around said travelling axis.

39. The loudspeaker of claim 38, wherein the loudspeaker comprises an audio amplifier.

40. A loudspeaker, comprising:
a diaphragm;
an interface configured to receive an audio signal; and
a voice coil system, comprising:
a magnetic circuit, comprising:
a magnetic gap; and
a voice coil suspended in said
magnetic gap, wherein said voice coil comprises a plurality of
voice coil sections which are driven independently and individually;
a plurality of inductive sensors mechanically coupled to said voice coil, said plurality of inductive sensors comprising a first inductive sensor and a second inductive sensor; and
a processing unit configured to:
selectively applying a driving signal individually to said plurality of voice coil sections of said voice coil to produce an electromotive force moving said voice coil along a travelling axis;
receive inductive sensor signals, said inductive sensor signals comprising a first inductive sensor signal based on an output from said first inductive sensor, and said inductive sensor signals comprising a second inductive sensor signal based on an output from said second inductive sensor;
determine at least one inductive sensor signal ratio based on said inductive sensor signals, said at least one inductive sensor signal ratio comprising a first inductive sensor signal ratio based on said first inductive sensor signal and said second inductive sensor signal, without based on the sum of said first inductive sensor signal and said second inductive sensor signal; and
determine a representation of a voice coil position based on said at least one inductive sensor signal ratio.

\* \* \* \* \*